US011759826B1

(12) United States Patent
Baring et al.

(10) Patent No.: US 11,759,826 B1
(45) Date of Patent: Sep. 19, 2023

(54) ARTICLE LOADING SYSTEM AND METHOD FOR MULTILEVEL SORTER

(71) Applicant: Tompkins Robotics, Inc., Raleigh, NC (US)

(72) Inventors: Bruce D. Baring, Orlando, FL (US); Michael C. Futch, Orlando, FL (US); James M. Serstad, Orlando, FL (US)

(73) Assignee: Tompkins Robotics, Inc., Orlando, FL (US)

(*) Notice: Subject to any disclaimer, the term of this patent is extended or adjusted under 35 U.S.C. 154(b) by 0 days.

(21) Appl. No.: 17/812,055

(22) Filed: Jul. 12, 2022

(51) Int. Cl.
*B07C 3/00* (2006.01)
*B07C 5/36* (2006.01)
*B65G 1/06* (2006.01)
*B65G 1/137* (2006.01)

(52) U.S. Cl.
CPC .............. *B07C 5/361* (2013.01); *B07C 3/008* (2013.01); *B65G 1/065* (2013.01); *B65G 1/1373* (2013.01)

(58) Field of Classification Search
CPC .... B07C 3/14; B07C 3/00; B07C 3/18; B07C 3/02; B07C 3/08; B07C 3/008; B07C 3/20; B07C 3/082
See application file for complete search history.

(56) References Cited

U.S. PATENT DOCUMENTS 10,086,998 B1* 10/2018 Tilekar .................. B65G 1/1373
11,123,771 B2* 9/2021 Kalm ...................... B07C 3/082
11,254,506 B1* 2/2022 Robin .............. G05B 19/41895
11,318,499 B2* 5/2022 Kalouche ............... B25J 9/1679
2018/0029796 A1* 2/2018 De Vries .................. B65G 1/06
2019/0160493 A1* 5/2019 Garrett .................... B61C 11/04
2022/0072587 A1* 3/2022 Gealy .................. B65G 1/1378

OTHER PUBLICATIONS

Webster's II New Riverside University Dictionary, 1984, The Riverside Publishing Company, p. 1015. (Year: 1984).*
Differences Between the AGV and MGV. Handling Specialty, 2023 [retrieved on May 24, 2023]. Retrieved from the Internet: ,URL: www.https://www.handling.com/company/blog/differences-between-the-agv-and-mgv/#:~:text=An%20AGV%20system%20injects%20safety,drive%20itself%20through%20the%20line.html>. (Year: 2023).*

* cited by examiner

Primary Examiner — Patrick H MacKey
(74) Attorney, Agent, or Firm — Parthiban A Mathavan

(57) ABSTRACT

A multi-level induction station is disclosed. The multi-level induction station includes multiple sorting levels arranged in a vertical stacked configuration; a vertically traveling automated lift that carries articles vertically between the sorting levels along a frame positioned proximate to the multiple sorting levels; an information acquisition device positioned to read information from an article on the lift; multiple transport devices positioned on the sorting levels to receive the articles; and a control system that directs the multi-level induction station to determine a destination for an article and direct the lift to a platform where a transport device is at an article-receiving position at the sorting level to receive the article.

17 Claims, 12 Drawing Sheets

ARTICLE LOADING SYSTEM AND METHOD FOR MULTILEVEL SORTER

TECHNICAL FIELD

The present invention relates generally to material handling technologies, and specifically to a multi-level induction station that uses automated lifts that allow for a single operator to induct articles to multiple locations from a single operator position.

BACKGROUND ART

Induction stations for material-handling facilities are well-known in the art. In a traditional induction station, an operator receives articles and loads or "inducts" them into a material handling device or system so that the articles can be further processed. As sortation of articles in general continues to become increasingly competitive, with lead times for delivery continually getting shorter, traditional induction stations present a bottleneck in that an operator at the induction station is time-limited by the maximum possible throughput of articles. Furthermore, the quantities of orders being processed at a given time is increasing, which requires more space for the order containers along the perimeter of the sorter. Whereas addition of further levels for sorting can operate to partially solve the problem, if these further levels were to be spaced vertically apart, such vertical expansion often presents an ergonomic hazard for an operator who will need to repetitively reach higher to induct the article on to the sorting device. Accordingly, a need exists for an ergonomic induction station that allows for a higher throughput by a single operator to multiple levels.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

According to one or more embodiments, a multi-level induction station includes multiple sorting levels arranged in a vertical stacked configuration. The multi-level induction station further includes a traveling automated lift having an article-carrying surface. The multi-level induction station further includes a frame positioned proximate to the multiple sorting levels with the frame extending at least as high as the highest sorting level of the multiple sorting levels. The frame is configured to support the lift as the lift travels between the multiple sorting levels. The multi-level induction station may further include an information acquisition device positioned such that the information acquisition device reads information from an article positioned on the article-carrying surface of the lift. The multi-level induction station further includes multiple transport devices, with at least one transport device at each sorting level. The multi-level induction station further includes a control system comprising a processor. The processor is configured for receiving article data identifying the article positioned on the article-carrying surface of the lift. The processor is further configured for determining a destination for the article positioned on the article-carrying surface of the lift based on the article data. The processor is further configured for directing the lift to one of the multiple sorting levels, where a transport device is positioned at an article-receiving position at one of the multiple sorting levels proximate the frame. The processor is further configured for directing the lift to deposit the article positioned on the article-carrying surface of the lift onto the transport device at the article-receiving position by manipulating the article-carrying surface of the lift. The processor is further configured for directing the transport device to the destination. The processor is further configured for directing the lift to an induction height or induction level.

According to one or more embodiments, a control system for a multi-level induction station is disclosed. The control system includes a processor. The processor is configured for receiving article data identifying an article positioned on an article-carrying surface of an automated lift that traverses a frame of the multi-level induction station. The processor is further configured for determining a destination for the article positioned on the article-carrying surface of the lift based on the article data. The processor is further configured for directing the lift to one of multiple sorting levels of the multi-level induction station, where a transport device is waiting at an article-receiving position at one of the multiple sorting levels proximate the frame. The processor is further configured for directing the lift to deposit the article positioned on the article-carrying surface of the lift onto the mobile transport device at the article-receiving position by manipulating the article-carrying surface of the lift. The processor is further configured for directing the mobile transport device to the destination. The processor is further configured for directing the lift to an induction height or induction level of the multi-level induction station.

According to one or more embodiments, a multi-level induction station is disclosed. The multi-level induction station includes multiple sorting levels arranged in a vertical stacked configuration. The multi-level induction station further includes a traveling automated lift having an article-carrying surface. The multi-level induction station further includes a frame positioned proximate to the multiple sorting levels with the frame extending at least as high as the highest sorting level of the multiple sorting levels. The frame is configured to support the lift as the lift travels between the multiple sorting levels. The multi-level induction station further comprises multiple transport devices, with at least one transport device at each sorting level. The multi-level induction station further includes a control system. The control system includes a processor. The processor is configured for directing the lift to one of the multiple sorting levels, where a transport device is at an article-receiving position at one of the multiple sorting levels proximate the frame. The processor is further configured for directing the lift to deposit the article positioned on the article-carrying surface of the lift onto the transport device at the article-receiving position by manipulating the article-carrying surface of the lift. The processor is further configured for directing the transport device to a destination. The processor is further configured for directing the lift to an induction height or induction level.

BRIEF DESCRIPTION OF THE DRAWINGS

In order to describe the technical solutions of the examples of the present invention more clearly, the figures required to be used for the examples will be briefly introduced below. It should be understood that the following figures only show some examples of the present invention, and thus shall not be construed as limiting the scope thereof.

and for a person skilled in the art, further relevant figures could also be obtained according to the figures without using inventive efforts.

DETAILED DESCRIPTION OF THE EMBODIMENTS

Below, the technical solutions in the examples of the present invention are depicted clearly and comprehensively with reference to the figures according to the examples of the present invention. Obviously, the examples depicted here are merely some examples, but not all examples of the present invention. In general, the components in the examples of the present invention depicted and shown in the figures herein can be arranged and designed according to different configurations. Thus, detailed description of the examples of the present invention provided in the figures below are not intended to limit the scope of the present invention as claimed, but merely represent selected examples of the present invention. On the basis of the examples of the present invention, all of other examples that could be obtained by a person skilled in the art without using inventive efforts will fall within the scope of protection of the present invention.

Embodiments disclosed herein provide for a solution to the problem of inefficient and ergonomically impractical induction stations. In particular, embodiments disclosed herein provide for a multi-level induction station that allows for a single operator to increase throughput of articles in a material-handling facility. The multi-level induction station described herein is automated, which helps to eliminate problems associated with human error, as well as increases efficiency of the induction station because it allows the operator to work more quickly. Additionally, the multi-level induction station is better for the operator because it provides a more ergonomic workspace that allows the operator to use smaller movements, leading to less fatigue and/or strain. The multi-level induction station described herein allows for induction stations that are taller than the reach of an operator, which allows for vertical expansion of induction stations to increase throughput.

Figure 1:
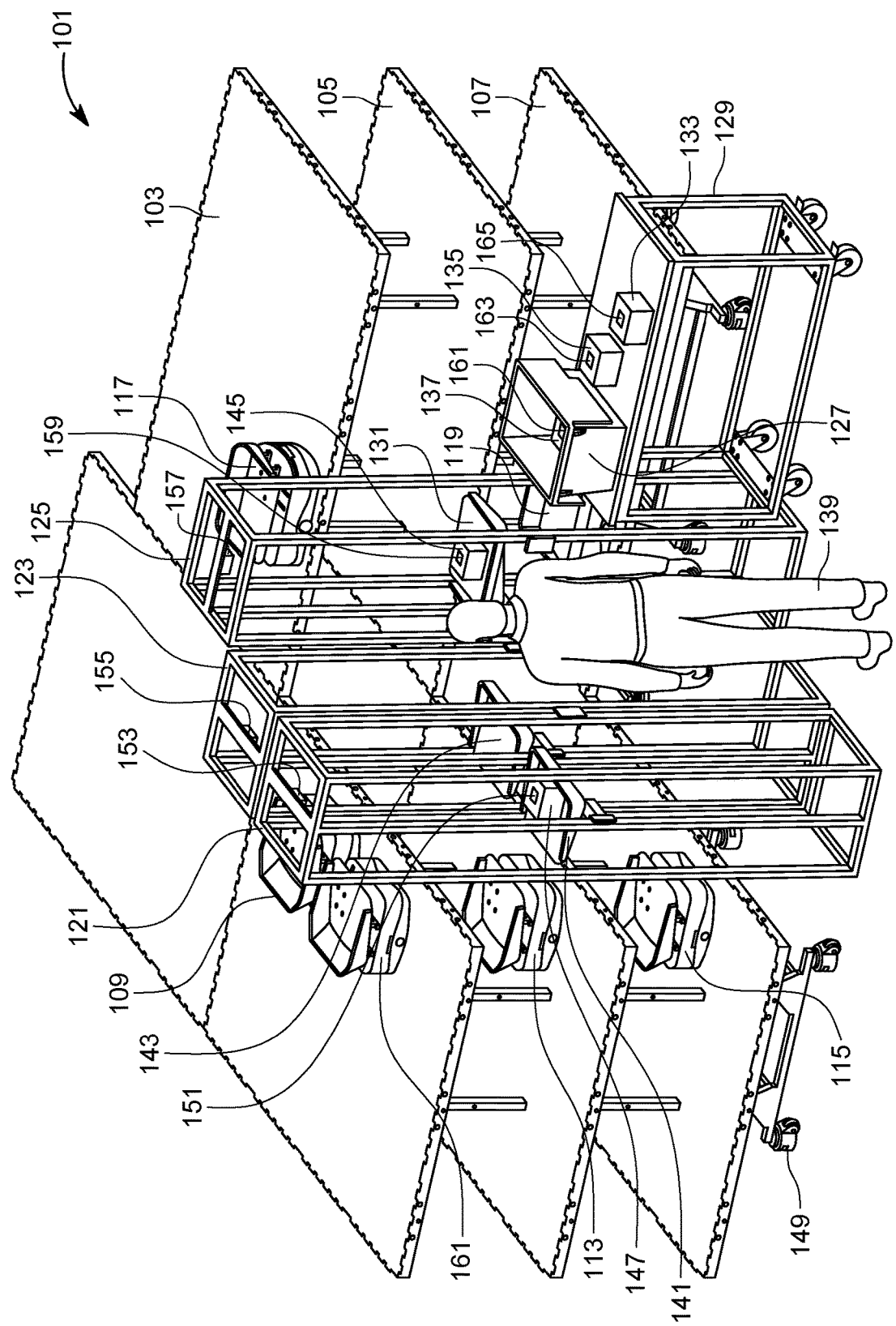
FIG. 1 depicts a front perspective view of an exemplary embodiment of the multilevel induction station.

FIG. 1 depicts a front perspective view of an exemplary embodiment of the multilevel induction station. Referring to FIG. 1, multi-level induction station 101 includes multiple sorting levels 103, 105, and 107 arranged in a vertical stacked configuration. In various embodiments, the multi-level induction station 101 may include two, three, four, or more sorting levels arranged in a vertical stacked configuration. In one embodiment, as shown in FIG. 1, the multiple sorting levels includes platforms at each level.

The multi-level induction station 101 is configured for inducting articles 133, 135, 137, 145, and 147. The articles may each include an identifier 151, 159, 161, 163, and 165. In various embodiments, the identifiers may take the form of a barcode, QR code, text label, RFID, or the like. The articles may be delivered to the multi-level induction station using an article delivery device 129. The article delivery device 129 may be a manual rolling cart (as shown in FIG. 1), an automated mobile transport device, a conveyor, a pick port from an automated storage system, or the like. Article delivery device 129 may carry the one or more articles 133, 135, and/or 137 directly on top of the delivery device, or article delivery device 129 may carry the one or more articles 133, 135, and/or 137 in a bin 127. The articles may be manually loaded from article delivery device 129 onto lifts such as lifts 131, 141, and 143, and the articles may then be automatically loaded onto the transport devices by intelligently controlling the lifts through the control system. In one embodiment, an operator may select one or more articles from article delivery device 129 or bin 127 and place the article on a lift with the identifier on the article positioned such that it can be read by an information acquisition device (for example, information acquisition device 153, 155, 157). The information acquisition device automatically interacts with the identifier for article recognition. One or more information acquisition devices (such information acquisition devices 153, 155, 157) may be located above the article to read the identifier of the articles from above. The one or more information acquisition devices may in lieu of, or in addition to, being located above the article, may also be located to the side of the article or otherwise positioned proximate to the article. It is envisioned that any configuration that allows the one or more information acquisition devices to read the identifier of the articles either before or after the articles are placed on the lifts is within scope of this invention. For example, in at least one embodiment, the identifier of the articles may be read by an information acquisition device in the form of a hand-held scanner—either before or after the articles are placed on the lifts. In one example, a human operator may scan the identifier of an article with the information acquisition device in the form of a hand-held scanner—before or after the article is placed on a tray of a lift. The information acquisition device then communicates the identifier information associated with the article to the control system. For example, in one embodiment, the information acquisition device communicates with a sorter execution system (shown, for example, in FIG. 11B) such as execution system 1164, which in turn communicates with the lift and a sorter control server such as sorter control server 1152. In at least one embodiment, the height of the article delivery device may be established, adjusted, or calibrated by the execution system 1164 such that the articles are at approximately the same elevation as the induction height or induction level, which allows the operator to work at an optimal induction height or induction level (e.g., a dynamically calculated but adjustable induction height determined for a specific operator's physical anatomy) in an ergonomic manner that avoids unnecessary or non-ergonomic bending, reaching, and/or vertical movement of their hands.

In at least one embodiment, the multi-level induction station 101 allows for more than one article to be placed on the lift whereby the multi-level induction station 101 allows for multiple inductions to a single lift by lifts 131, 141 or 143. In such an embodiment, the identifier of each of the articles may be scanned (either by the information acquisition device or by a human operator) prior to, simultaneous to, or after the placing of the multiple articles on the lift. In one embodiment, the control system may correspondingly be configured to communicate to an operator on the specific articles that need to be inducted to the single lift of lifts 131, 141 or 143, and the control system may further require the operator to acknowledge once all the specified articles have been inducted to the single lift before the next step in the process commences.

Multi-level induction station 101 further includes one or more traveling automated lifts such as lifts 131, 141, and 143, each having an article-carrying surface; in some embodiments, the lifts may be configured to travel vertically; in some embodiments, the lifts may be configured to travel in three dimensions; in various embodiments, the article-carrying surface may be configured for carrying or otherwise supporting odd-shaped articles including articles such as a garment on a hanger. The article-carrying surface may be manipulated to deposit an article from the lift onto a transport device positioned at an article-receiving position at one of the multiple sorting levels. In one embodiment, the article-carrying surface may be or may include a tilt tray. In a tilt tray, the tray tilts to one side while gravity pulls the article off of the tray. Articles slide onto the transport device at an article-receiving position at the sorting level. The tray then rights itself and is ready to accept another article. A tilt tray can typically handle different articles, which can be small or large, amorphous, or regular, light or heavy. The tilting motion of the tilt tray may include a forward motion (i.e., towards the transport device such as transport device 109, 111, 113, 115, 117 or 119) simultaneous to the tilting motion so that the front edge (i.e., the edge closest to the transport device) of the tray of the lift overlaps at least a portion of the transport device at the article-receiving position at the sorting level when tilting to allow for a smoother delivery of the article from the tray of the lift to the transport device. In another embodiment, the article-carrying surface may be or may comprise a crossbelt that includes a belt conveyor powered by a small motor. The motor moves the conveyor to discharge the article sideways off of the crossbelt and onto the transport device at the article-receiving position of the sorting level. A crossbelt sorter can typically handle articles with irregular shapes. In another embodiment, the lift or article-carrying surface may include a non-tilting tray with an article-pushing mechanism. In another embodiment, the lift or article-carrying surface may comprise a crossbelt or an article-pushing mechanism or an article diverting mechanism.

In one embodiment, the lift may include or take the form of a crane. In one embodiment, the lift may include or take the form of an extendable robotic arm; in one embodiment, the robotic arm may be configured to hold an article, carry the article and deposit the article onto a transport device positioned at an article-receiving position at one of the multiple sorting levels. In one embodiment, the lift may be replaced with any of the commonly known divert mechanisms that operate to transfer the article from the lift onto the transport device.

Figure 7:
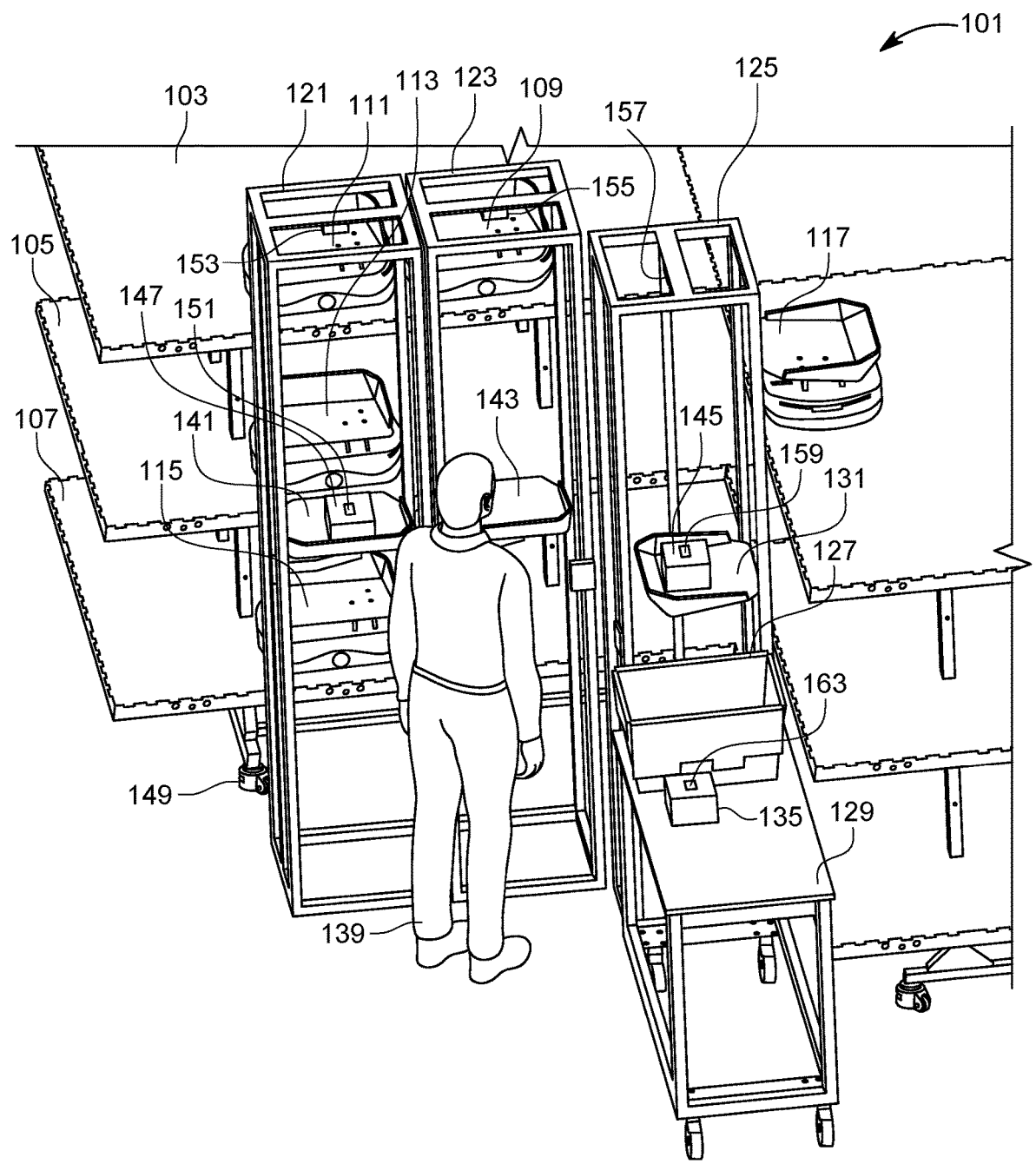
FIG. 7 depicts a side perspective view of an exemplary embodiment of the multilevel induction station.

Each of lifts 131, 141, and 143 may be set to a particular induction height or induction level, which is a height at which the lift stops, for e.g., within the frame such as frame 121, 123, and 125, to receive articles from the operator 139. The induction height or induction level may be set by default to a particular precalculated height or a particular real-time dynamically calculated height. In some embodiments, the induction height is set to a default height determined by the processor of the control system. Alternatively, the induction height or induction level may be set or customized by the operator 139 to account for the height of the operator, the length of the operator's arms and for attributes such as whether the operator is sitting or standing. In some embodiments, the processor of the control system is configured to allow the induction height to be set to a user-specified height. Allowing for a customizable elevation for the induction height or induction level provides for better ergonomics for the operator. In one embodiment, the multi-level induction station 101 may include a button to adjust the induction height or induction level to allow the operator to set the height which is most comfortable to induct from the operator's perspective. For e.g., an induction height or induction level as illustrated in FIG. 7 may be preferred position by a first operator 139 but not necessarily represent a position preferred by a second or third operator 139.

Multi-level induction station 101 includes frames 121, 123, and 125 positioned proximate to the multiple sorting levels with the frames extending at least as high as the highest sorting level of the multiple sorting levels. Each frame is configured to support a lift as the lift travels vertically between multiple sorting levels. Each frame may include a plurality of support rails. The lift may be moved vertically by belts, worm drives, pulleys, rack and pinion, or other such mechanisms. In various embodiments, the frame may form a square or rectangular shape, as shown in FIG. 1, for example. The support rails of the frame may be engaged by the lifts whereby the support rails support the lifts and allow the lifts to travel in a vertical direction, and optionally in traverse and horizontal directions as well. In one embodiment, each frame occupies a footprint that is slightly larger than the footprint occupied by a transport device. For example, in one embodiment, each frame may be 19" (w)×19" (d)×82" (h). The height of the frame may be adjusted or customized depending on the height of the top platform and the height of the ceiling, in addition to other related features. In various embodiments, the multiple induction station comprises multiple frames positioned proximate to one another.

In one embodiment, the multi-level induction station 101 may further include a shielding panel (not shown in FIG. 1, for clarity) on one or more sides of the frames; in one embodiment, the shielding panel is configured on the operator facing side of the frame such that the operator only has a hole or an opening provided on the shielding panel to induct through that hole or opening. In various embodiments, the shield accordingly includes an induction opening or induction hole to facilitate placement of the article on the article-carrying surface of the lift. In various embodiments, the shielding panel can operate to protect the operator's hands from the moving parts of the lift. In various embodiments, the shield panel may be provided on additional sides of the frame with or without openings provided therein for purposes such as lift access, operator access, transport vehicle access, inspection access, maintenance access, and similar other purposes. In at least one embodiment, the shield panel may be formed of transparent or translucent materials. In some embodiments, the multi-level induction station 101 may further include one or more sensors that operate to prevent the lift from moving as long as an operator's arm has not been pulled out of the opening allowing access to the lift and tray. Accordingly, in at least one embodiment, the frame further includes a sensor that prevents the lift from moving before an operator's arm has been pulled out of the induction opening.

The information acquisition devices 153, 155, and 157 of multi-level induction station 101 is each positioned on a frame such that the information acquisition device reads information from an article positioned on the article-carrying surface of the lift. In one embodiment, as shown in FIG. 1, each information acquisition device is positioned on or about an underside area, for e.g., of a support rail, of each frame such that it reads the identifier on an article below it. Information acquisition devices 153, 155, and 157 are configured for imaging or otherwise interrogating an image or other identifier of an article to determine an identification and/or destination thereof. In various embodiments, the information acquisition devices may be barcode readers, QR code readers, text readers, RFID readers, or the like. The information acquisition devices are configured to acquire article information of the articles, and the article information may contain destinations of the articles. The information acquisition devices interact with the identifier on the article or with the article itself.

Multi-level induction station 101 further includes multiple transport devices 109, 111, 113, 115, 117, and 119, with at least one transport device at each sorting level. In various embodiments, the transport devices 109, 111, 113, 115, 117, and 119 may include an automated guided vehicle (AGV), a delivery robot, a transportation robot, a loading/unloading robot, a rail robot, a bin on a rail system, a bin on a conveyor system, a bin on a track-based system, a track and conveyor system, or other types of traveling robots that can operate on a platform or rail system. The transport devices may be self-powered and self-guided; the transport devices may be part of a rail system such that they travel a predetermined path; the transport devices may be driven by an external source of locomotion such a worm gear motion setup for example. In at least one embodiment, the transport devices are in wireless communication with the control system. In one embodiment, based on instructions/signals received from the control system, the transport devices can travel in all directions across a platform to a destination area for further processing. The control system operates to manage the operation of transport devices along the platforms, including movement of the mobile transport devices and avoiding collisions among mobile transport devices, and all other associated tasks. In other embodiments, the transport devices run on a rail system or a conveyor belt to a destination area for further processing. In at least one embodiment, based on instructions/signals received from the control system, the transport device can travel in all directions across a first platform to a lift system, followed by the lift system transporting the transport device to a second platform above or below the first platform, followed by the transport device travelling in all directions across the second to a destination area for further processing. In at least one embodiment, the transport device can travel in all directions across a first platform to a robotic elevator system, followed by the robotic elevator system transporting the transport device along with the article thereon to a second platform above or below the first platform, followed by the transport device travelling in all directions across the second to a destination area for further processing.

In some embodiments, the multi-level induction station further includes multiple transport systems, wherein each system includes multiple transport devices. The multi-level induction station may operate with other sortation systems and thereby used to induct, for example, to three levels of bomb bay sorters stacked upon each other.

Multi-level induction station 101 further includes a sorter control system (see FIGS. 11A and 11B) comprising a processor. The sorter control system, and the processor thereof, is configured for receiving article data identifying an article positioned on the article-carrying surface of a lift. The processor is further configured for determining a destination for the article positioned on the article-carrying surface of the lift based on the article data. The processor is further configured for directing a lift to one of the multiple sorting levels, where a transport device is positioned at an article-receiving position at one of the multiple sorting levels proximate the frame. In one embodiment, the processor selects a specific transport device among a plurality of transport devices to be positioned at the article-receiving position at a specific sorting level among a plurality of sorting levels proximate the frame. The processor is further configured for directing the lift with the article positioned on the article-carrying surface of the lift to deposit the article onto the transport device positioned at the article-receiving position by manipulating the article-carrying surface of the lift (for e.g., FIGS. 8-10 that show the deposit of an article by the lift). The processor is further configured for directing the transport device to the destination. The processor is further configured for directing the lift to an induction height or induction level.

In one embodiment, as shown in FIGS. 1-7, the multiple sorting levels may include multiple platforms, and the transport devices may include automated mobile transport devices (e.g., robots) that travel over the platform. In one embodiment, the automated mobile transport devices are positioned at or close to the edge of the platform in the article-receiving position in alignment with the lifts.

In at least one embodiment, the information acquisition devices are optional. For example, in a sorting system in which the same type of article is always being inducted at a given induction station, or a certain quantity of the same type of article is being inducted, or an upstream system provides the article information, there is no need to separately identify the articles using an information acquisition device. In such an embodiment, the multi-level induction station comprises multiple sorting levels arranged in a vertical stacked configuration. The multi-level induction station further comprises a vertically traveling automated lift having an article-carrying surface. The multi-level induction station further comprises a frame positioned proximate to the multiple sorting levels with the frame extending at least as high as the highest sorting level of the multiple sorting levels. The frame is configured to support the lift as the lift travels vertically between the multiple sorting levels. The multi-level induction station further comprises multiple transport devices, with at least one transport device positioned at each sorting level. The multi-level induction station further comprises a control system that includes a processor. The processor is configured for directing the lift to one of the multiple sorting levels, where a transport device is at an article-receiving position at the one of the multiple sorting levels proximate the frame. The processor is further configured for directing the lift to deposit the article positioned on the article-carrying surface of the lift onto the transport device at the article-receiving position by manipulating the article-carrying surface of the lift. The processor is further configured for directing the transport device to a destination. The processor is further configured for directing the lift (back) to an induction height.

In various embodiments, multi-level induction station 101 may be portable; for example, the multi-level induction station 101 may be on wheels 149. This allows the multi-level induction station to be moved within a material-handling facility to an optimal position or location where it can be used most effectively. The provision of wheels also allows for the easy addition of additional multi-level induction stations during busy times, such as the holidays.

In various embodiments, multi-level induction station 101 may be modular. For example, each of the multiple sorting levels or platforms may be assembled in sections, which allows for the multi-level induction station 101 to be easily reconfigurable to fit any material-handling facility. Accordingly, in various embodiments, multi-level induction station 101 may be reconfigurable into various dimensions whereby the length, breadth, area and other attributes of each sorting level or platform can be reconfigured.

Figure 2:
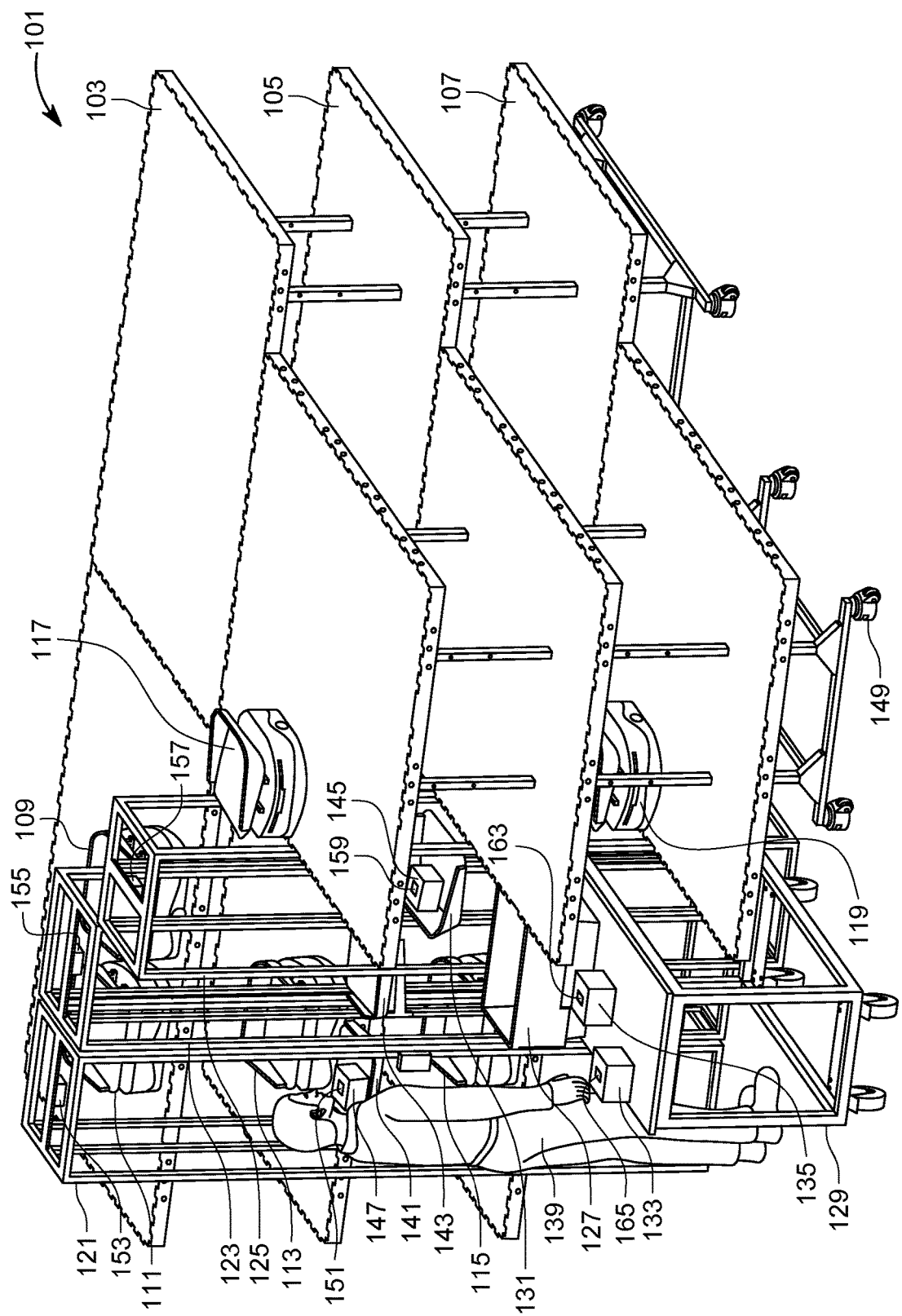
FIG. 2 depicts a side perspective view of an exemplary embodiment of the multilevel induction station.
Figure 3:
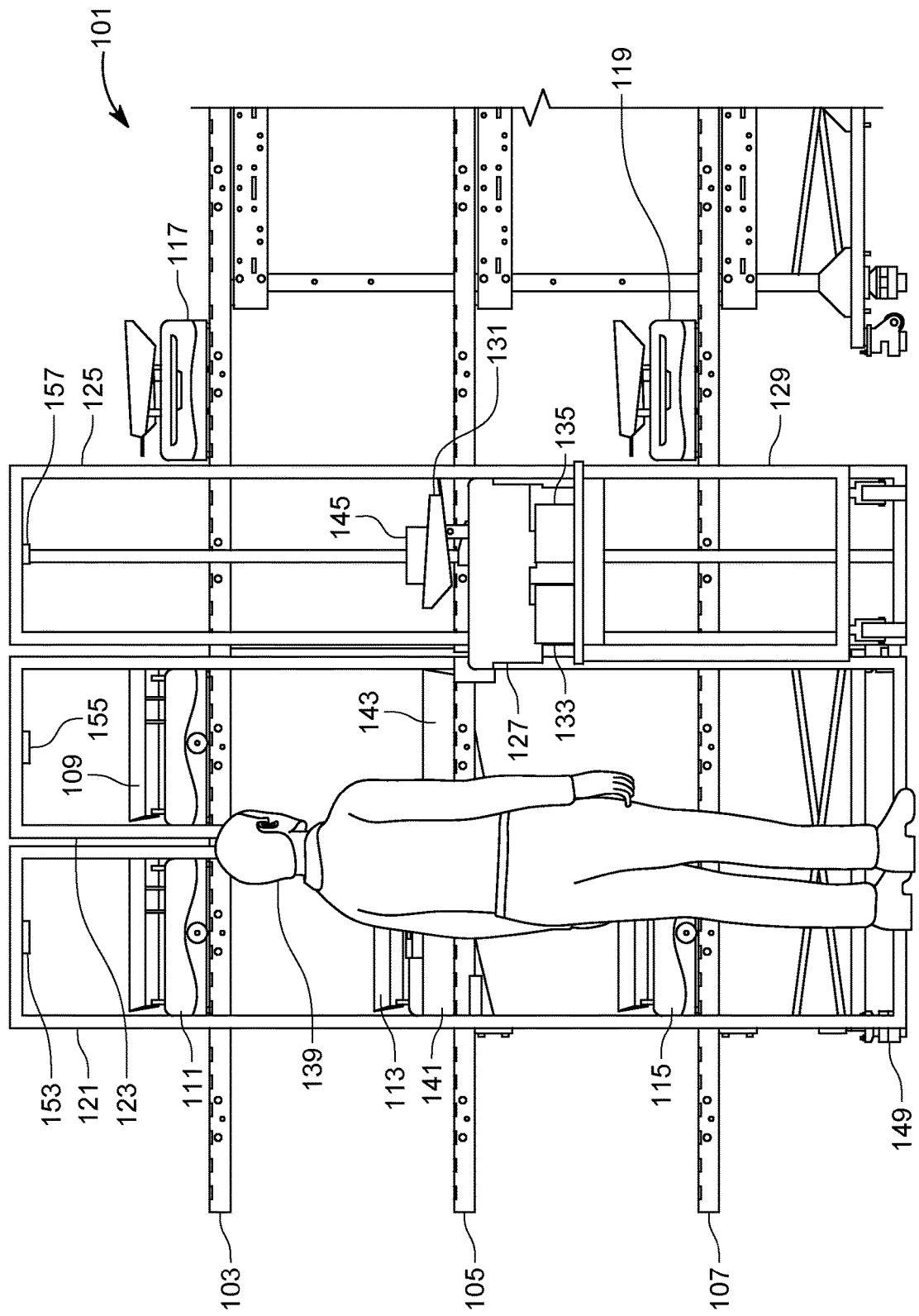
FIG. 3 depicts a side view of an exemplary embodiment of the multilevel induction station.
Figure 4:
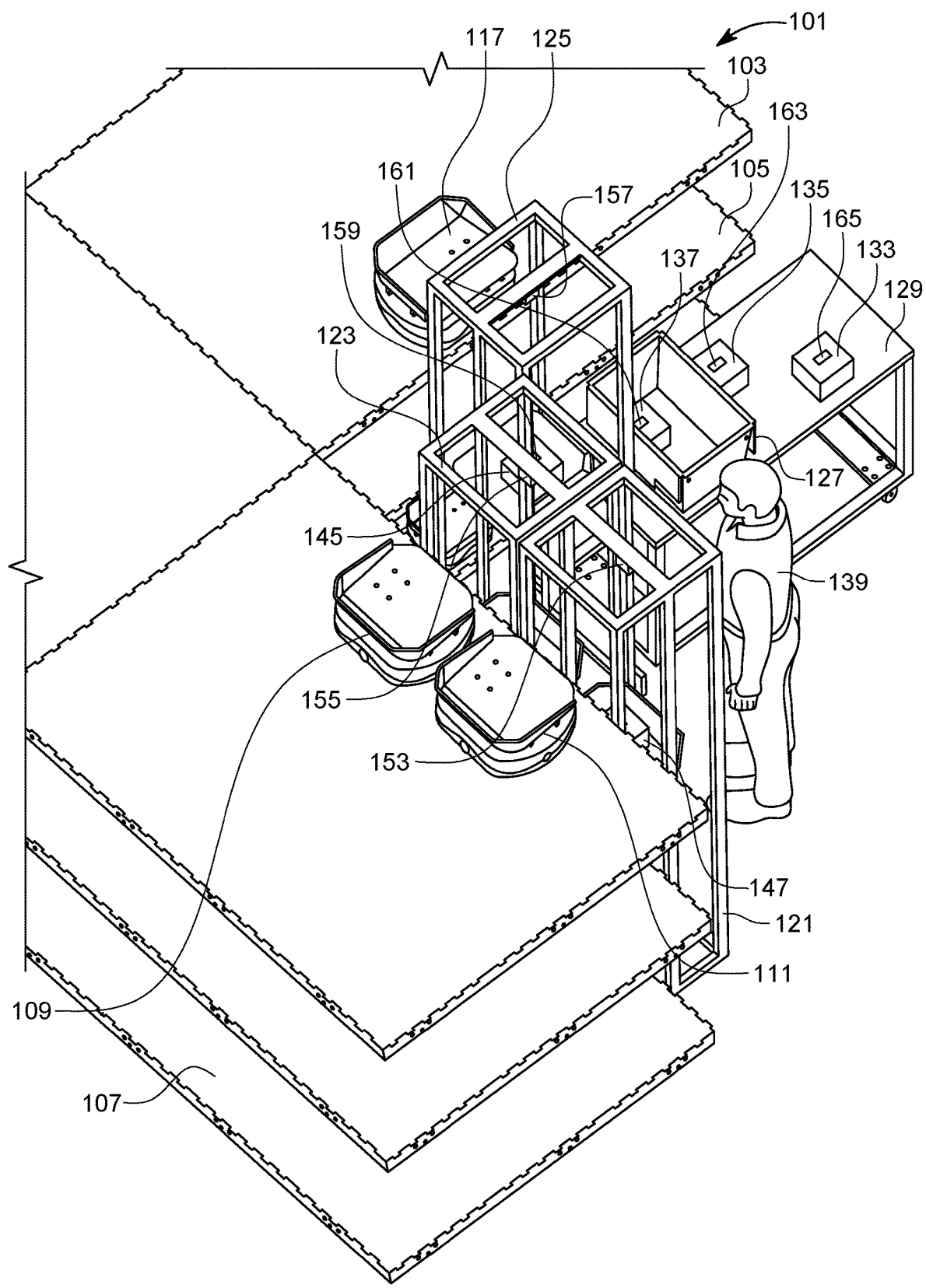
FIG. 4 depicts a top perspective view of an exemplary embodiment of the multilevel induction station.
Figure 5:
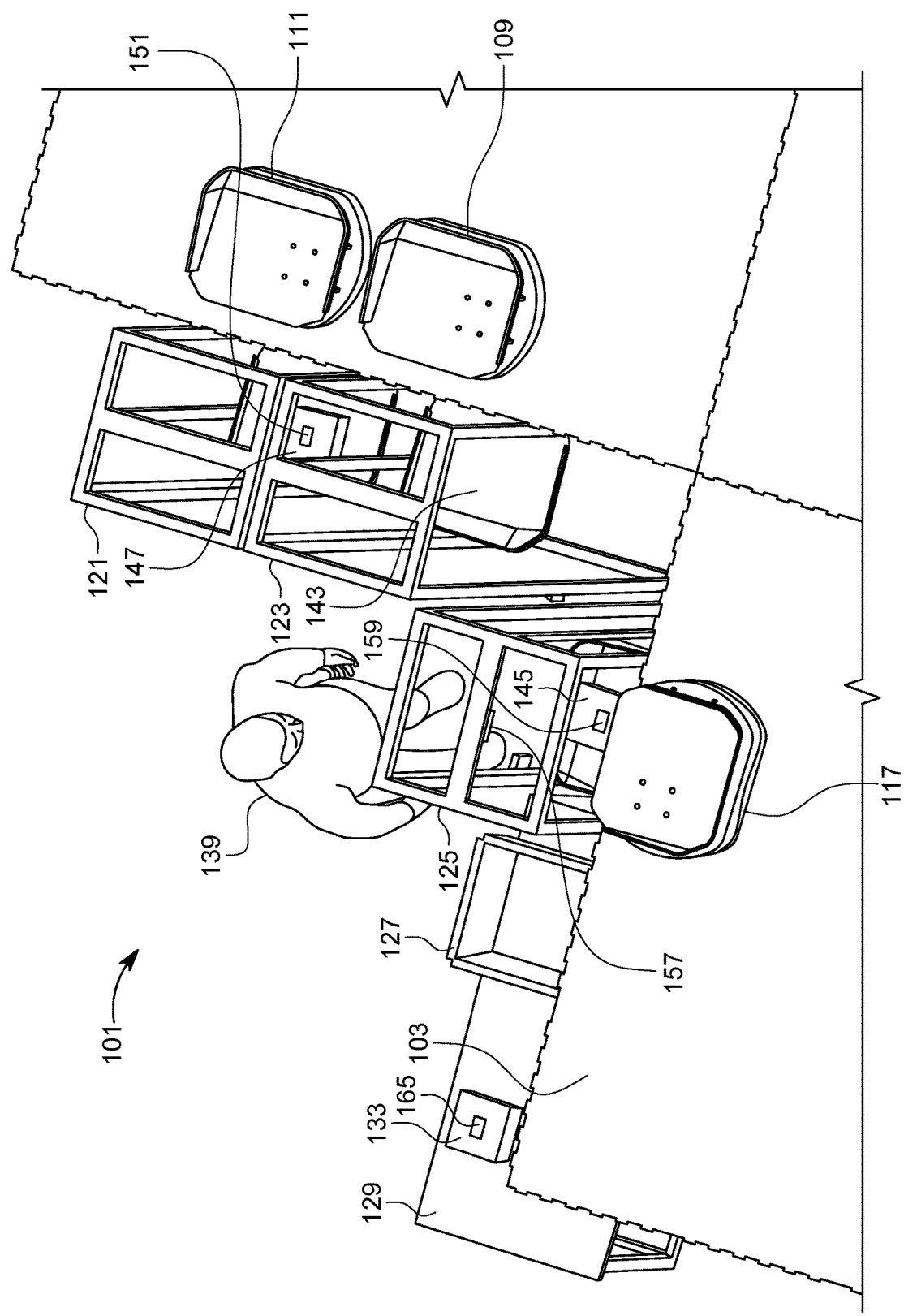
FIG. 5 depicts a top perspective view of an exemplary embodiment of the multilevel induction station.
Figure 6:
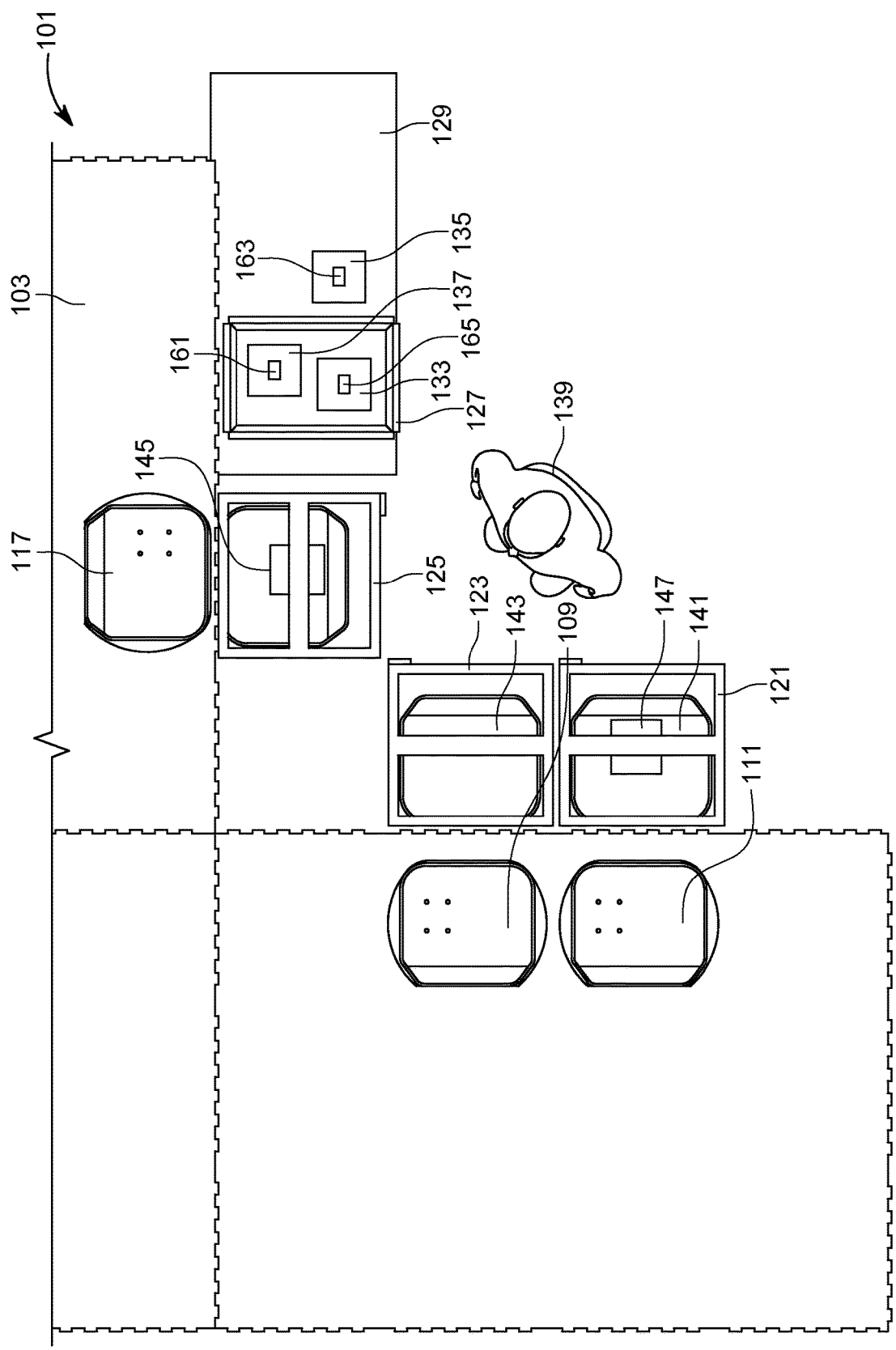
FIG. 6 depicts a top view of an exemplary embodiment of the multilevel induction station.

FIG. 2 depicts a side perspective view of an exemplary embodiment of the multilevel induction station. FIG. 2 shows many of the same components shown in FIG. 1 from a different perspective. FIG. 3 depicts a side view of an exemplary embodiment of the multilevel induction station. FIG. 3 shows many of the same components shown in FIG. 1 from a different perspective. FIG. 4 depicts a top perspective view of an exemplary embodiment of the multilevel induction station. FIG. 4 shows many of the same components shown in FIG. 1 from a different perspective. FIG. 5 depicts a top perspective view of an exemplary embodiment of the multilevel induction station. FIG. 5 shows many of the same components shown in FIG. 1 from a different perspective. FIG. 6 depicts a top view of an exemplary embodiment of the multilevel induction station. FIG. 6 shows many of the same components shown in FIG. 1 from a different perspective. FIG. 7 depicts side perspective view of an exemplary embodiment of the multilevel induction station. FIG. 7 shows many of the same components shown in FIG. 1 from a different perspective. In FIG. 7, lift 143 is at an induction position that is set based on the preferences of a specific operator 139.

Figure 8:
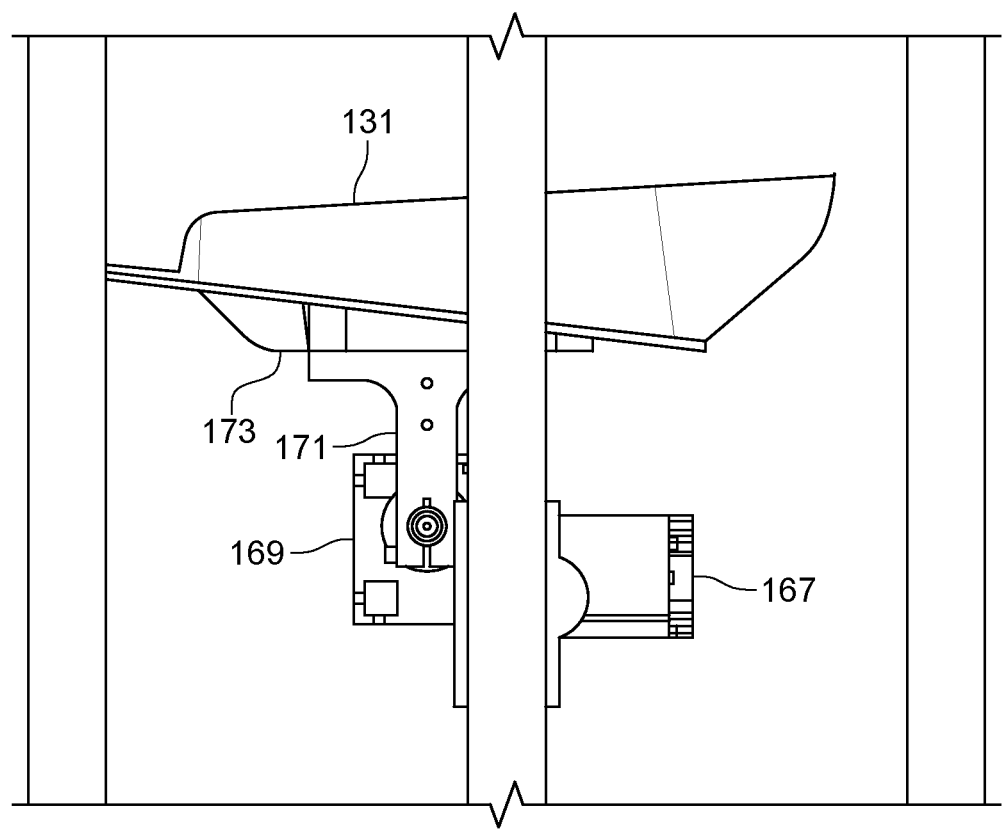
FIG. 8 depicts a side perspective view of an embodiment of an automated lift of the multilevel induction station.

FIG. 8 depicts a side perspective view of an embodiment of an automated lift of the multilevel induction station. Referring to FIG. 8, automated lift 131 runs along or about a support rail forming part of the frame such as frame 121, 123, and 125. Motor 167 causes the lift 131 to traverse (e.g., ascend or descend) the support rail of the frame. Tilt mechanism 169 causes the tray to tilt forward (e.g., to an article-depositing position) and/or backward (e.g., back to an article-carrying position) by rotating the arm 171. In the embodiment shown in FIG. 8, the tray rotates to deposit an article being carried onto a transport device at an article-receiving position. In at least one embodiment, additional motors such as motor 167 may be provided to cause the lift to traverse along additional support rails of the frame in all 3-directions: vertical, horizontal, and traverse. In some embodiments, arm 171 may be configured to move lift 131 in three-dimensional space through the provision of suitable servo drive mechanism, for example, similar to those used in 3D printers. In various embodiments, the lift is configured for movement in three-dimensional space.

Figure 9:
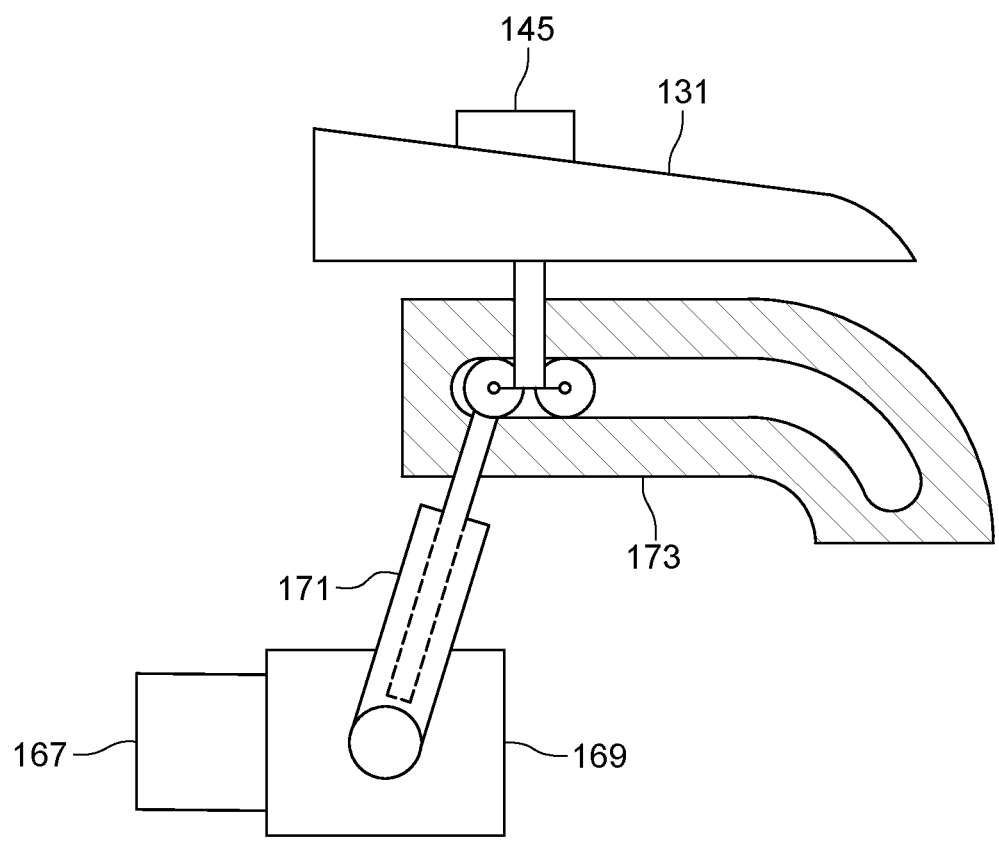
FIG. 9 depicts a side perspective view showing a first position of an embodiment of an automated lift of the multilevel induction station.
Figure 10:
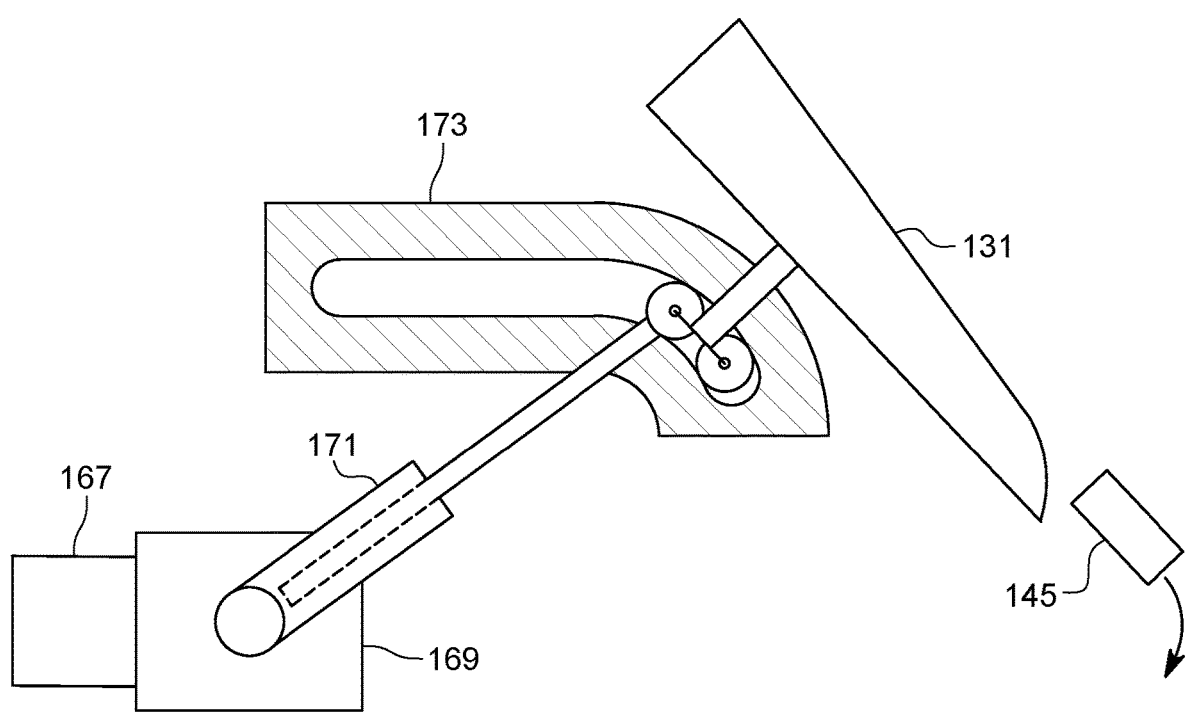
FIG. 10 depicts a side perspective view showing a second position of an embodiment of an automated lift of the multilevel induction station.

FIG. 9 depicts a side perspective view showing a first position of an embodiment of an automated lift of the multilevel induction station whereas FIG. 10 depicts a side perspective view showing a second position of the same embodiment of an automated lift of the multilevel induction station. Referring to FIG. 9 and FIG. 10, motor 167 causes the lift 131 to traverse (e.g., ascend or descend in a vertical direction) the frame to a position that is proximal to a transport device or to a position that is proximal an induction height or induction level such as the level shown in FIG. 3 or FIG. 7, for example. Tilt mechanism 169 causes the tray to tilt forward (e.g., to an article-depositing position) and/or backward (e.g., back to an article-carrying position) by rotating and extending and/or withdrawing the arm 171. In at least one embodiment, as the arm 171 extends, the tray simultaneously slides forward or moves forward along track 173, which causes the tray to first slide forward or move forward (e.g., move in a forward direction toward the transport device) and then the tray is rotated to a downward angle to allow article 145 to slide off the tray (as shown in FIG. 10) to a transport device positioned at an article-receiving position of one of the sorting levels.

Figure 11A:
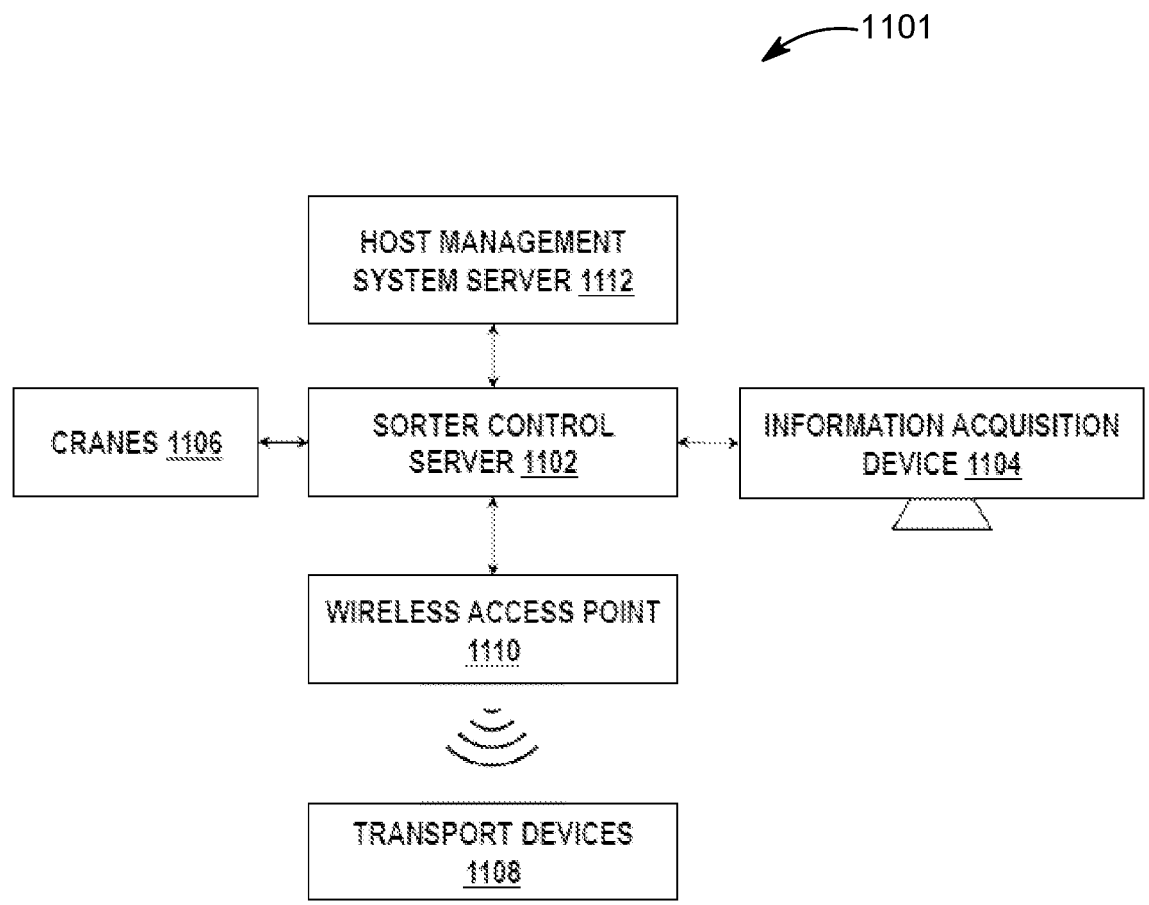
FIG. 11A depicts an exemplary block diagram of an exemplary embodiment of the multilevel induction station.

FIG. 11A depicts an exemplary block diagram of an exemplary embodiment of the multi-level induction station described herein. Referring to FIG. 11A, multi-level induction system 1101 includes sorter control server 1102, information acquisition devices 1104, lifts 1106, and transport devices 1108, wireless access point 1110, and host management system server 1112, which are depicted in a representative manner as blocks representing a generic descriptor of the technology.

Figure 11B:
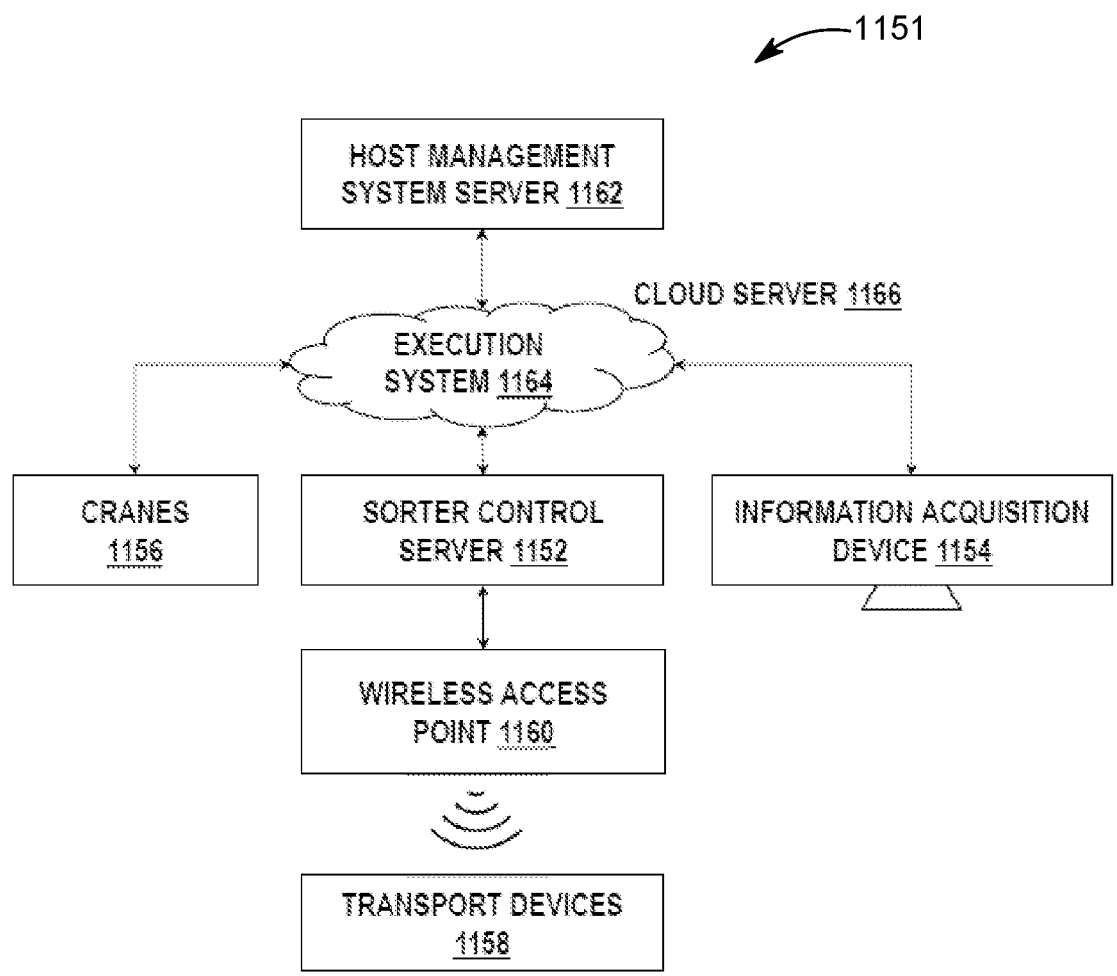
FIG. 11B depicts an exemplary block diagram of an exemplary embodiment of the multilevel induction station.

FIG. 11B depicts an exemplary block diagram of an exemplary embodiment of the multi-level induction station described herein. Referring to FIG. 11B, multi-level induction system 1151 includes sorter control server 1152, information acquisition devices 1154, lifts 1156, and transport devices 1158, wireless access point 1160, host management system server 1162, execution system 1164, and cloud server 1166, which are depicted in a representative manner as blocks representing a generic descriptor of the technology.

Referring to FIGS. 11A and 11B, wireless access point 1110/1160 communicates wirelessly with transport devices 1108/1158. Sorter control server 1102/1152 is configured for communicating with one or more components of the multi-level induction station 1101/1151 as described herein, and as shown, for example, in FIG. 1. In one embodiment, sorter control server 1102/1152, host management system server 1112/1162, execution system 1164, and/or cloud server 1166 include memory, a processor, and/or one or more communication interfaces. A network may form part of multi-level induction station 1101/1151, wherein the network may take on any appropriate form, including a wireless network such as WiFi, cellular, or other frequency bands for private use, or a hard-wired network such as LAN, WAN, internet, etc., and combinations thereof. In one embodiment, sorter control server 1102/1152 communicates over the network with the cloud (e.g., cloud server 1166) or with resources accessible via the cloud. In some embodiments, one or more components of sorter control server 1102/1152 may reside in the cloud. Similarly, several of the components such as, for example, transport devices 1108/1158, lifts 1106/1156, and information acquisition devices 1104/1154, sorter control server 1102/1152, and/or host management server 1112/1162 may communicate over the network with the cloud. In some embodiments, one or more components of multi-level induction station 1101/1151 may reside in the cloud. For example, in one embodiment, sorter control server 1102/1152 and/or execution system 1164 may reside in the cloud. In one embodiment, sorter control server 1102/1152 and one or more other components of multi-level induction station 1101/1151 may be in communication with the cloud.

As used herein, the term "cloud" refers to several servers connected to the internet that can be leased as part of a software or application service. Cloud-based services can include web hosting, data hosting and sharing, and software or application use. The term "cloud" also refers to cloud computing, where several servers are linked together to share the load. This means that instead of using one single powerful machine, complex processes can be distributed across multiple smaller computers. In various embodiments, sorter control server 1102/1152, host management server 1112/1162, and cloud server 1166 can be or can otherwise include a server as the term "server" is understood in its broadest sense. The term "server" as used herein includes any computer that provides data to other computers. It may serve data to systems on a local area network (LAN) or a wide area network (WAN) over the Internet. In various embodiments, sorter control server 1102/1152 can be or can include a cloud server (e.g., cloud server 1166). The term "cloud server" as used herein includes any pooled, centralized server resource that is hosted and delivered over a network—typically the Internet—and accessed on demand by multiple users. A cloud server can be remotely located (e.g., reside in a remote cloud server configuration). A cloud server can be a virtual server (rather than a physical server) running in a cloud computing environment. A cloud server can be built, hosted, and delivered via a cloud computing platform via the internet, and can be accessed remotely. A cloud server can include all the software it requires to run and can function as an independent unit. A cloud server can perform all the same functions of a traditional physical server including delivering processing power, storage, and applications. One of the advantages of cloud storage is that there are many distributed resources acting as one—often called federated storage clouds. This makes the cloud very tolerant of faults, due to the distribution of data. Use of the cloud can reduce the creation of different versions of files, due to shared access to documents, files, and data.

Further, each of the components shown in FIGS. 1-11B may be in communication with one or more other components through a wired and/or a wireless network. For example, the cloud and sorter control server 1102/1152 may further communicate with transport devices 1108/1158, lifts 1106/1156, and information acquisition devices 1104/1154 over a network.

In various embodiments, sorter control server 1102/1152 operates to induct articles through the multi-level induction station to deliver the inducted articles to the transport devices 1108/1158, which then transport the articles across the sorting levels (e.g., platforms) to a destination for further processing.

In one embodiment, sorter control server 1102/1152 includes a controller. Sorter control server 1102/1152 is configured to determine a destination for a particular article identified by an information acquisition device among a plurality of possible destinations based on the interaction with the identifier and a determined destination for the article. Sorter control server 1102/1152 is further configured to direct the lift to transport the article to the transport device at the article-receiving position.

In various embodiments, sorter control server 1102/1152, either alone or in combination with host management server 1112/1162 and/or execution system 1164, may coordinate delivery of a plurality of articles to various destinations, wherein sorter control server 1102/1152 may be further configured for coordinating the delivery of the plurality of articles by one or more of: a human process, a mechanical process, and a robotic process. The lifts and transport devices work together to carry a plurality of articles to their respective destinations, as determined by sorter control server 1102/1152 and/or the execution system 1164 and as directed by sorter control server 1102/1152 and/or the execution system 1164.

Control server 1102/1152 may operate to complete an analytical processing of the obtained article information of all the articles to be sorted, thereby obtaining the destination information of the respective articles. Sorter control server 1102/1152 and/or execution system 1164 are in communication with the information acquisition devices to obtain the article information acquired by the information acquisition devices, to obtain the destinations of the respective articles.

In operation, the operator receives one or more articles at the multi-level induction station. The one or more articles may be transported to the operator by the article delivery device. The operator removes one of the articles from the article delivery device and places it on the article-carrying surface (e.g., tray) of a lift that is waiting at the induction height or induction level. As can be seen from FIG. 1, for example, the operator loads the tray of the lift from the back side of the tray (i.e., the side of the tray that faces the operator). In at least embodiment, the tray of the lift is capable of rotating at least 90 degrees or 180 degrees whereby a front or a side of the tray faces the operator to allow the operator to load the tray of the lift from the front side of the tray, followed by the tray rotating to its original position such that the back side of the tray faces the operator before the next step of the process commences. The information acquisition device reads the identifier on the article on the article-carrying surface of the lift (for example, from above, from the side, or near the lift). The information acquisition device transmits the identifier information to the control system, which identifies the article and the article's destination. The control system then assigns the article on the tray of the lift to a particular transport device and transmits the location of the selected transport device to the lift. The lift then traverses (e.g., ascends or descends) the frame (as appropriate) to the correct height for the selected transport device. Once the lift has arrived at the correct height, the lift deposits the article on the assigned transport device at the article-receiving position. In one embodiment, the tray on the lift tilts forward to cause the article to slide off the front side of the tray onto the assigned transport device. The tilt motion of the tray of the lift may include a forward motion simultaneous to the tilt motion so that the front edge of the tray of the lift overlaps the transport device when tilting to allow for a smoother delivery of the article from the tray of the lift to the transport device (see FIGS. 9 and 10). After delivery of the article to the assigned transport device, the lift returns to the induction height or induction level so that it is ready to receive the next article from the operator.

It will be understood that various configurations of the frames are possible, based on the number of operators and the reach of each operator. For example, with two frames placed side-by-side in a three-level station, one operator can ergonomically load articles onto six different robot locations. Similarly, with two frames placed side-by-side in a four-level station, one operator can ergonomically load articles onto eight different robot locations.

Additionally, with three frames places in a corner in a three-level system, as shown in FIG. 1, for example, the operator can ergonomically load articles onto nine different robot locations.

As to the above, they are merely specific embodiments of the present invention; however, the scope of protection of the present invention is not limited thereto, and within the disclosed technical scope of the present invention, any modifications or substitutions that a person skilled in the art could readily conceive of should fall within the scope of protection of the present invention. Thus, the scope of protection of the present invention shall be determined by the scope of protection of the appended claims.

The invention claimed is:

1. A multi-level induction station, comprising:
   multiple sorting levels arranged in a vertical stacked configuration;
   a vertically traveling automated lift having an article-carrying surface;
   a frame positioned proximate to the multiple sorting levels with the frame extending at least as high as the highest sorting level of the multiple sorting levels,
   wherein the frame is configured to support the lift as the lift travels between the multiple sorting levels;
   multiple transport devices, with at least one transport device at each sorting level, wherein the multiple transport devices are self-powered and self-guided automated guided vehicles (AGVs) operating on a platform, wherein the platform is a continuous planar surface with no openings formed thereon; and
   a control system comprising a processor, the processor configured for:
      receiving article data identifying the article positioned on the article-carrying surface of the lift;
      determining a destination for the article positioned on the article-carrying surface of the lift based on the article data;
      directing the lift to one of the multiple sorting levels, where a transport device is at an article-receiving position at one of the multiple sorting levels proximate the frame;
      directing the lift to deposit the article positioned on the article-carrying surface of the lift onto the transport device at the article-receiving position by manipulating the article-carrying surface of the lift;
      directing the transport device to the destination; and
      directing the lift to an induction height,
      wherein the transport device is in wireless communication with the control system.

2. The multi-level induction station of claim 1, further comprising an information acquisition device positioned such that the information acquisition device reads information from the article positioned on the article-carrying surface of the lift, wherein the article data is received from the information acquisition device.

3. The multi-level induction station of claim 1, wherein the multi-level induction station is portable.

4. The multi-level induction station of claim 3, wherein the multi-level induction station is on wheels.

5. The multi-level induction station of claim 1, wherein the multi-level induction station is modular.

6. The multi-level induction station of claim 1, wherein the multi-level induction station is reconfigurable.

7. The multi-level induction station of claim 1, wherein the article-carrying surface is a tilt tray.

8. The multi-level induction station of claim 7, wherein the tilt tray is configured to move in a forward direction toward the transport device while tilting to overlap the transport device.

9. The multi-level induction station of claim 1, wherein the lift is configured for movement in three-dimensional space.

10. The multi-level induction station of claim 1, wherein the induction height is set to a default height determined by the processor.

11. The multi-level induction station of claim 1, wherein the induction height is set to a user-specified height.

12. The multi-level induction station of claim 1, wherein the multi-level induction station comprises at least two sorting levels arranged vertically.

13. The multi-level induction station of claim 1, wherein the multi-level induction station comprises multiple frames positioned proximate to one another.

14. A control system for a multi-level induction station, the control system having a processor configured for:
   receiving article data identifying an article positioned on an article-carrying surface of an automated lift that traverses a frame of the multi-level induction station;
   determining a destination for the article positioned on the article-carrying surface of the lift based on the article data;
   directing the lift to one of multiple sorting levels of the multi-level induction station, where a mobile transport device is waiting at an article-receiving position at one of the multiple sorting levels proximate the frame, wherein the mobile transport device is a self-powered and self-guided automated guided vehicle (AGV) operating on a platform, wherein the platform is a continuous planar surface with no openings formed thereon;
   directing the lift to deposit the article positioned on the article-carrying surface of the lift onto the mobile transport device at the article-receiving position by manipulating the article-carrying surface of the lift;
   directing the mobile transport device to the destination; and
   directing the lift to an induction height of the multi-level induction station,
   wherein the transport device is in wireless communication with the control system.

15. The control system of claim 14, wherein article data is received from an information acquisition device positioned on the frame of the multi-level induction station.

16. The control system of claim 14, wherein processor is further configured for directing the transport device to the article-receiving position.

17. A multi-level induction station, comprising:
   multiple sorting levels arranged in a vertical stacked configuration;
   a traveling automated lift having an article-carrying surface;
   a frame positioned proximate to the multiple sorting levels with the frame extending at least as high as the highest sorting level of the multiple sorting levels,
   wherein the frame is configured to support the lift as the lift travels between the multiple sorting levels;
   multiple transport devices, with at least one transport device at each sorting level, wherein the multiple transport devices are self-powered and self-guided automated guided vehicles (AGVs) operating on a platform, wherein the platform is a continuous planar surface with no openings formed thereon; and
   a control system comprising a processor, the processor configured for:
      directing the lift to one of the multiple sorting levels, where a transport device is at an article-receiving position at one of the multiple sorting levels proximate the frame;
      directing the lift to deposit the article positioned on the article-carrying surface of the lift onto the transport device at the article-receiving position by manipulating the article-carrying surface of the lift;
directing the transport device to a destination; and
directing the lift to an induction height,
wherein the transport device is in wireless communication with the control system.

* * * * *